United States Patent Office 2,952,582
Patented Sept. 13, 1960

2,952,582
INSECT COMBATTING EMPLOYING 2-(1-AMINO-CYCLOHEXYL)-CYCLOHEXANONE

Lyle D. Goodhue, Bartlesville, and Kenneth E. Cantrel, Dewey, Okla., and Jack R. Gaines, Rapid City, S. Dak., assignors to Phillips Petroleum Company, a corporation of Delaware No Drawing. Filed June 18, 1958, Ser. No. 742,738

11 Claims. (Cl. 167—30)

This invention relates to combatting of insects. In one of its aspects, the invention relates to an agent novel for the combatting of insects. In another one of its aspects, the invention relates to a method for combatting insects. In a further aspect of the invention, it relates to a method and composition for repelling insects such as flies, for example, houseflies.

Insect combatting agents and mixtures are widely used to control flies, mosquitoes, roaches and other insects, both domestic and agricultural. Thus, the field of insect-combatting agents is divided broadly into two classifications, i.e., agricultural and household. While the primary purpose of both of these types of agents is to combat the insect, in most cases, to kill the same, but in some cases to repel the same, the agent should possess certain other also desirable properties. Thus, the effect, whatever it might be, should last a long enough time between applications such that repeated applications at short intervals of time will not be necessary. Also, preferably, especially in the case of household insects or insects which attack the human or agricultural animal, the agent should be applicable without danger to any desirable animal such as the recited animals and domestic pets. Furthermore, especially for combatting insects which infest desirable living bodies such as animals, the agent should be strongly repellent in character.

It has now been discovered that 2-(1-aminocyclohexyl)cyclohexanone is an effective agent for combatting insects, especially for repelling flies, such as houseflies. Properly diluted in an insect repellent adjuvant or dispersant applicable to household and agricultural animals, and in some cases to humans, the said compound is effective to repel insects from said animals.

It is an object of this invention to provide insect combatting agents. Another object is to provide insect repellents. It is a further object of this invention to provide an additive for insect combatting compositions. It is another object of this invention to provide a method for combatting insects. Another object of the invention is to provide a method for repelling an insect, especially flies.

Other aspects, objects and several advantages of the invention are apparent from a study of this disclosure and the appended claims.

According to the invention, 2-(1-aminocyclohexyl)-cyclohexanone is provided as an active ingredient in an insect combatting method and/or composition.

The insect combatting agent of this invention can be applied to surfaces from which houseflies are to be repelled in the form of solutions, dusts, emulsions, suspensions, aerosols, and the like, or as the pure compound. When solvents are employed, the compound is dissolved in a material which is inert with respect to the active insect combatting ingredient. Some examples of suitable solvents are acetone, kerosene, naphthas, and other liquid hydrocarbons boiling above atmospheric temperatures. Some specific examples of solid inert carrier materials which can be utilized are talc, kieselguhr, and the like. When the insect combatting agent of this invention is applied as an aqueous emulsion or dispersion, wetting agents such as alkylated aryl polyether alcohols can be employed.

A presently preferred composition according to the invention is that obtained employing a substantially odor-free Soltrol (a trademark) which is an isoparaffinic hydrocarbon solvent fraction boiling in the approximate range of 260–800° F. and which preferably has been prepared by hydrofluoric acid alkylation with an olefin under alkylation conditions known in the alkylation art as are exemplified in U.S. Patent 2,773,920, issued December 11, 1956, in the names of L. H. Vautrain and Edward Strunk.

When the insect combatting agent of this invention is used in the form of a solution, the lower effective concentration is about 0.1% by weight, the upper limit being dictated only by economic considerations. When employing dusts, a suitable concentration of active ingredient is from 1 to 20 weight percent, although higher or lower amounts can be used if desired.

The insect combatting agent of this invention is most advantageously applied to a surface from which houseflies are to be repelled in the form of a very thin film. In general, 0.01 to 5 grams of the insect combatting agent is deposited on each square foot of a particular surface. In most cases, from 0.1 to 3.0 grams per square foot are deposited.

A particularly advantageous method for applying the insect combatting agent of this invention to the desired surfaces is in the form of a wettable powder. An example of a suitable wettable powder can be made up by dissolving 25 parts by weight of 2-(1-aminocyclohexyl)-cyclohexanone in acetone, adding 2 parts by weight of a wetting agent, stirring in 73 parts by weight of a finely divided attapulgite, and evaporating off the acetone. The resulting dried powder can be employed for repelling houseflies or attracting gnats by dispersing a desired amount of this powder in water and spraying this dispersion onto the desired surface.

The insect combatting agent of this invention can be combined with pyrethrum synergists such as N-(2-ethylhexyl)bicyclo[2.2.1] - 5 - heptene - 2,3 - dicarboximide (MGK-264), piperonyl butoxide, the n-octyl sulfoxide of isosafrole and sesoxane. The insect combatting agent can also be combined with knockdown agents such as n-butyl sulfone, pyrethrum and allethrin. It may also be formulated with other repellents such as 2,3,4,5-bis-(Δ²-butenylene)tetrahydrofurfural, a di-n-alkyl ester of pyridine-2,5-dicarboxylic acid in which the alkyl group contains 2–4 carbon atoms, e.g., the di-n-propyl ester of pyridine-2,5-dicarboxylic acid and the like. It may also be combined with insecticides such as DDT, Dieldrin, Methoxychlor, Chlordane and the like. The combination of the agent of this invention with insecticides is particularly applicable where it is desired to cause the insect to be activated so that more of the insecticide is contacted and/or absorbed by the insect.

The insect combatting agent of this invention can be prepared by the condensation of cyclohexanone and ammonia as described in Chemical Abstracts, vol. 50, 13904f (1956).

The following specific examples are intended to illustrate the usefulness of the insect combatting agent of this invention, but it is not intended that he invenion be limied to the particular embodiments shown therein.

EXAMPLE I

Cyclohexanone was condensed with ammonia by the following procedure to form 2-(1-aminocyclohexyl)cyclohexanone. In this preparation, 294 grams of cyclohexanone, 6 grams of ammonium chloride, and 24 grams of anhydrous calcium chloride were charged to a 790 milliliter stainless steel bomb. The bomb was sealed and 65 grams of anhydrous ammonia was charged to the bomb. The bomb was then heated to 95° F. and rocked at this temperature for 3 hours. The bomb was then cooled to 77° F. and vented, and a yellow, viscous oil was recovered. After washing, the material was crystallized from methanol to yield 263 grams of 2,4-dipentamethylene - 5,6 - tetramethylene - 2,3,4,5 - tetrahydropyrimidine. This compound was dehydrolyzed with 10 percent sulfuric acid by shaking at room temperature for 10 minutes. This hydrolysis gave a 73 mol percent yield of cyclohexanone and the sulfate of 2-(1-aminocyclohexyl)cyclohexanone. The pure amine, obtained as a colorless oil, was prepared by treating the purified hydrochloride (obtained by treating the crude amine in ether with anhydrous HCl) with concentrated ammonium hydroxide. The yield of amine via the sulfate was 69 mol percent based on the pyrimidine. The free amine was also prepared by hydrolysis of the pyrimidine with 10 percent aqueous HCl followed by ammonium hydroxide treatment. This method gave a yield of 83 mol percent based on the pyrimidine. The 2-(1-aminocyclohexyl)cyclohexanone thus prepared was a clear colorless oil having a refractive index $n_D^{20}$ of 1.5119.

The above prepared compound was then tested for repellency to houseflies by the Sandwich Bait method which is essentially that disclosed by L. B. Kilgore in Soap, June 1949. In accordance with this method, two smooth, thin strips of unsulfured molasses about ⅜ inch wide and 3½ inches long were applied to a sheet of cardboard, leaving a margin of at least ¼ inch all around and a space of at least one inch between the strips. The prepared cardboard strips were then oven dried at 45° C. (113° F.). Strips of highly porous lens paper, 1 inch by 4 inches in dimension, were impregnated with 2-(1-aminocyclohexyl)cyclohexanone by immersing them in an acetone solution containing the desired quantity of this compound, and then allowing the strips to dry over a period of 4 to 6 hours.

An impregnated strip was superimposed on each strip of molasses and was fastened in place by stapling it to the cardboard backing. The loose fibrous lens paper permits the flies to remove the molasses through it. The prepared strips were then exposed to about 150 houseflies, *Musca domestica*, over 5 days old, which had been starved for 6 hours. Counts of the number of flies feeding on the strips were taken periodically for 2½ or 2¾ hours. A non-repellent material in the sandwich bait becomes black with flies soon after being exposed, and the molasses will often be entirely consumed in 5 minutes. The results of two tests are expressed below as Table I:

*Table I*

| Time in Minutes after Exposure | Number of Flies Feeding—Weight Percent Repellent in Acetone Solution | |
|---|---|---|
| | 1% | 0.5% |
| 5 | 1 | 0 |
| 15 | 1 | 0 |
| 30 | 0 | 1 |
| 45 | 0 | 0 |
| 60 | 2 | 2 |
| 75 | 0 | 0 |
| 90 | 1 | 0 |
| 105 | 1 | 0 |
| 120 | 1 | 0 |
| 135 | 2 | 0 |
| 150 | 3 | 0 |
| 165 | 3 | 0 |
| Estimated Percent of Molasses remaining after starving overnight | 85 | 90 |

EXAMPLE II

A formulation was made up which contained 5 percent by weight of 2-(1-aminocyclohexyl)cyclohexanone, 10 percent by weight of N-(2-ethylhexyl)bicyclo[2.2.1]-5-heptene-2,3-dicarboximide and 85 percent by weight xylene. This solution was swabbed onto ¾ inch diameter vertical pipes in the grills over dairy barn windows. Nine replications were made. A visual examination showed that the formulation was repellent to stable flies and houseflies.

Reasonable variation and modification are possible within the scope of the foregoing disclosure and the appended claims to the invention, the essence of which is that 2-(1-aminocyclohexyl)cyclohexanone has been found to be an effective agent for combatting insects, particularly for repelling the same, and especially for repelling stable and houseflies.

We claim:

1. A method of combatting an insect which comprises subjecting said insect to an effective quantity of 2-(1-aminocyclohexyl)cyclohexanone.

2. A method of repelling an insect from a surface which comprises applying 0.01–5 grams of 2-(1-aminocyclohexyl)cyclohexanone to said surface per square foot thereof.

3. An insect-combatting composition comprising an effective amount of 2-(1-aminocyclohexyl)cyclohexanone and an effective amount of an insecticide.

4. An insect-combatting composition comprising an effective amount of 2-(1-aminocyclohexyl)cyclohexanone and an effective amount of at least one of a compound selected from the group of insect-combatting agent synergists consisting of N-(2-ethylhexyl)bicyclo[2.2.1]-5-heptene-2,3-dicarboximide, piperonyl butoxide, n-octyl sulfoxide of isosafrole and sesoxane.

5. An insect-combatting composition comprising an effective amount of 2-(1-aminocyclohexyl)cyclohexanone and 2,3,4,5-bis($\Delta^2$-butenylene)tetrahydrofurfural.

6. An insect-combatting composition comprising an effective amount of 2-(1-aminocyclohexyl)cyclohexanone and a di-n-alkyl ester of pyridine-2,5-dicarboxylic acid in which the alkyl group contains 2–4 carbon atoms.

7. A method of combatting a fly which comprises subjecting said fly to an effective quantity of 2-(1-aminocyclohexyl)cyclohexanone.

8. A method of repelling stable flies which comprises subjecting said flies to an effective repellent quantity of 2-(1-aminocyclohexyl)cyclohexanone.

9. A method of repelling a house fly which comprises subjecting said fly to an effective repellent quantity of 2-(1-aminocyclohexyl)cyclohexanone.

10. An insect-combatting composition comprising 2-(1-aminocyclohexyl)cyclohexanone, a dispersing agent, and an insect-combatting adjuvant.

11. A composition according to claim 10 wherein the insect-combatting adjuvant is selected from the group consisting of acetone, kerosene, naphtha, and an isoparaffinic hydrocarbon solvent fraction boiling in the approximate range of 260–800° F.

References Cited in the file of this patent

UNITED STATES PATENTS

| 2,572,577 | Tissol | Oct. 23, 1951 |
| 2,614,961 | Dickey | Oct. 21, 1952 |
| 2,757,120 | Leonard | July 31, 1956 |

OTHER REFERENCES

King, U.S. Dept. Agr. Handbook No. 69, May 1954, p. 138.

Chem. Absts., 50 13904(f), 1956.

De Ong: Chemistry and Uses of Pesticides, 2nd ed., 1956, Reinhold Pub. Corp., p. 167.